United States Patent
Zhou et al.

(10) Patent No.: US 12,255,504 B2
(45) Date of Patent: Mar. 18, 2025

(54) ROTOR ELECTRICAL GROUNDING SYSTEM

(71) Applicant: GM GLOBAL TECHNOLOGY OPERATIONS LLC, Detroit, MI (US)

(72) Inventors: Sen Jiang Zhou, Troy, MI (US); Alireza Fatemi, Canton, MI (US); Jack M Gayney, Grosse Ile, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 347 days.

(21) Appl. No.: 17/819,701

(22) Filed: Aug. 15, 2022

(65) Prior Publication Data

US 2024/0055959 A1 Feb. 15, 2024

(51) Int. Cl.
*H02K 11/40* (2016.01)
*H02K 7/00* (2006.01)

(52) U.S. Cl.
CPC ............ *H02K 11/40* (2016.01); *H02K 7/003* (2013.01)

(58) Field of Classification Search
CPC .................... H02K 11/40; H02K 7/003
See application file for complete search history.

(56) References Cited

U.S. PATENT DOCUMENTS

| 6,670,733 | B2 | 12/2003 | Melfi | |
| 8,183,727 | B2 | 5/2012 | Fee et al. | |
| 8,189,317 | B2 | 5/2012 | Oh et al. | |
| 8,488,293 | B2 | 7/2013 | Baumann | |
| 9,917,491 | B2 * | 3/2018 | Northwall | ............ H02K 5/136 |
| 2007/0138748 | A1 * | 6/2007 | Orlowski | ................ H02K 5/10 |
| | | | | 310/90 |
| 2010/0187946 | A1 * | 7/2010 | Orlowski | ............... H02K 11/40 |
| | | | | 310/232 |
| 2011/0204734 | A1 * | 8/2011 | Orlowski | ................ H02K 5/10 |
| | | | | 310/85 |
| 2021/0391680 | A1 * | 12/2021 | Brushkivskyy | ...... H02K 11/026 |

FOREIGN PATENT DOCUMENTS

EP 1300927 A1 * 4/2003 ............. H01R 39/64

OTHER PUBLICATIONS

EP-1300927-A1, Suter et al. all pages (Year: 2003).*

* cited by examiner

*Primary Examiner* — Naishadh N Desai
(74) *Attorney, Agent, or Firm* — Lorenz & Kopf LLP (57) ABSTRACT

An electric machine grounding system with low impedance includes a rotor that has a shaft assembly and that is configured to rotate about an axis. The shaft assembly has a surface. A housing supports the shaft assembly for rotation of the rotor. A holder extends from the housing. A ground assembly is held between the holder and the shaft assembly and includes a plurality of strands that extend to the surface to ground the shaft assembly to the housing.

19 Claims, 9 Drawing Sheets

ROTOR ELECTRICAL GROUNDING SYSTEM

INTRODUCTION

The present disclosure relates to electric current associated deterioration of rotating elements in electric machines such as motors of vehicles. More specifically, the disclosure relates to systems that avoid current related deterioration through rotor shaft grounding to avoid voltage buildup.

Electric motors are in widespread use across a wide range of applications, including in vehicle propulsion systems. Many applications, including electrified vehicle applications, often employ a variable frequency drive (VFD) to control AC motors. The VFD adjusts frequency of the applied voltage to control the speed of the motor. While current related deterioration of rotating elements may arise in a variety of electric machine types including those using pulse width modulation (PWM) control, VFD controlled AC motors in particular may experience induced voltage that results in stray currents, such as in the rotor shaft. Voltage buildups from the stray currents may discharge through various paths that include rotating elements, such as bearing and gears. Effects of the buildup and subsequent discharge may deteriorate the rotating elements through actions such as electric discharge machining (EDM) and white etching cracking (WEC) of the bearings and/or gears, both of which may result in certain cases. EDM and WEC may lead to undesirable noise and vibration in the rotating elements.

Mitigating and minimizing effects such as EDM and WEC is desirable to increase the lifespan of electrified rotating systems including electrical machines such as motors, and to avoid undesirable noise perceptions by a human, such as an operator of the equipment. For example, in the context of an automobile, such as a passenger vehicle, occupants of a moving vehicle may experience noise, at least to some degree. In some cases, noise and/or vibration may become unpleasant at varying speeds and therefore, is desirably avoided.

It would be desirable to minimize rotating element deterioration related to electric current effects and any resulting noise/vibration in rotating systems in an efficient and effective manner. It would also be desirable that any solutions involve minimal modification of existing motor designs. Furthermore, other desirable features and characteristics of the present disclosure will become apparent from the subsequent detailed description and the appended claims, taken in conjunction with the accompanying drawings and the foregoing introduction.

SUMMARY

In a number of embodiments, an electric machine grounding system with low impedance includes a rotor that has a shaft assembly and that is configured to rotate about an axis. The shaft assembly has a surface. A housing supports the shaft assembly for rotation of the rotor. A holder extends from the housing. A ground assembly is held between the holder and the shaft assembly and includes a plurality of strands that extend to the surface to ground the shaft assembly to the housing.

In additional embodiments, the surface is disposed on a first cone section of the shaft assembly. The ground assembly comprises a bar assembly that includes a head with a second cone section that faces the first cone section. The second cone section is spaced from the first cone section. The strands are fixed in the head and extend from the second cone section to the first cone section.

In additional embodiments, a tip contacts the shaft assembly and includes a tail held by the holder.

In additional embodiments, a bearing is disposed in the housing and supports the shaft assembly. The holder comprises a cover engaged with the housing and covering the bearing.

In additional embodiments, the holder comprises a cantilevered arm fixed to the housing.

In additional embodiments, a bearing in the housing supports the shaft assembly. The shaft assembly includes an insert that has a flange extending radially outward and engaging the bearing to retain the bearing in the housing. The surface is defined by the insert.

In additional embodiments, the strands comprise carbon fibers aggregated to form bristle-like strands.

In additional embodiments, a number of brush assemblies each carry a plurality of the strands and each brush assembly fixed to the ground assembly.

In additional embodiments, the ground assembly comprises a head carrying the strands and a stem engaged in an opening of the head by a castle joint that includes a step.

In additional embodiments, a spring is contained in the opening and is captured between the head and the stem.

In a number of other embodiments, an electrical grounding system for an electric machine includes a rotor that includes a shaft assembly configured to rotate about an axis. The shaft assembly includes a shaft and an insert contained in the shaft. A housing supports the shaft assembly for rotation of the rotor. A holder extends from the housing and across the axis. A bar assembly is held between the holder and the insert. The bar assembly includes a profile section containing a plurality of strands that extend to the insert.

In additional embodiments, the bar assembly includes a head that defines the profile section, and the insert includes a surface facing the profile section. The surface is spaced from the profile section. The strands are fixed in the head and extend from the profile section to the surface.

In additional embodiments, the bar assembly includes a head with a tip contacting the shaft assembly and includes a stem engaging the head. The stem includes a tail held by the holder.

In additional embodiments, the housing defines a cavity. A bearing is disposed in the cavity and supports the shaft assembly. The holder comprises a cover engaged with the housing, closing the cavity, and covering the bearing.

In additional embodiments, the holder comprises an arm fixed to the housing. The arm extends across the axis and includes an offset section. The arm biases the bar assembly toward the insert.

In additional embodiments, a bearing is disposed in the housing and supports the shaft assembly. The insert includes a flange extending radially outward and engaging the bearing to retain the bearing in the housing.

In additional embodiments, the strands comprise carbon fibers aggregated in a composite structure to form the strands.

In additional embodiments, a number of brush assemblies are configured as rings and carry a plurality of the strands. Each brush assembly is fixed to the bar assembly.

In additional embodiments, the bar assembly comprises a head carrying the strands and a stem engaging in a blind opening of the head by a castle joint with a step. A spring is contained in the blind opening and is captured between the head and the stem.

In a number of other embodiments, an electrical grounding system for an electric machine of a vehicle includes a propulsion system in the vehicle. The electric machine is configured to supply torque to the propulsion system. A rotor of the electric machine includes a shaft assembly configured to rotate about an axis. The shaft assembly includes a shaft and an insert contained in the shaft. The insert has a cone section. A housing supports the shaft assembly for rotation of the rotor. A holder extends from the housing and across the axis. A bar assembly is held between the holder and the insert. The bar assembly includes a head with a tip contacting the shaft assembly in the cone section. The bar assembly includes a stem engaging the head. The stem includes a tail held by the holder. The strands are contained by the head and electrical conductivity is provided between the shaft and the housing through the bar assembly and the holder.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description.

Figure 1:
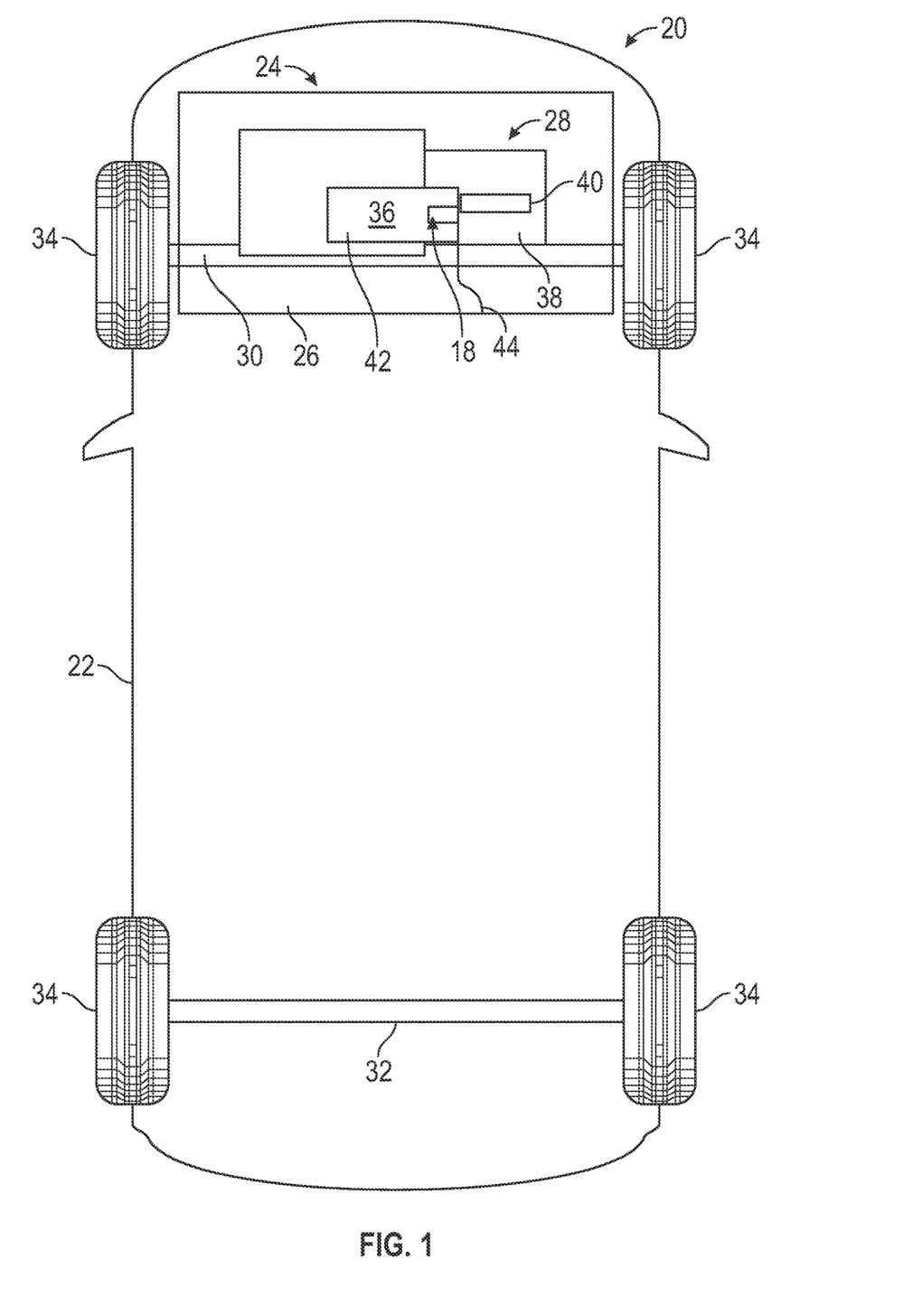
FIG. 1 is a schematic illustration of a vehicle with a propulsion system including an electric machine, in accordance with various embodiments.

Referring to FIG. 1, in a number of embodiments, an electrical grounding system 18 may be included in a vehicle 20. The vehicle 20 may be any one of a number of different types of land, sea, or air vehicles, and in certain embodiments, may for example, be a passenger automobile of any configuration. While the electrical grounding system 18 may be described within an embodiment of a vehicle 20, it is not limited to that embodiment but has application in a number of applications embodied in any environment where electric current management is useful in avoiding effects on rotating elements.

As depicted in FIG. 1, the vehicle 20 includes a body 22 arranged on, or integrated with, a chassis 24. In general, the body 22 and/or the chassis 24 serve as an electrical ground for systems of the vehicle 20. The chassis 24 includes a cradle 26 that supports a propulsion system 28. The chassis 24 may also include a front axle 30 and a rear axle 32 each coupled with wheels 34. The propulsion system 28 may include any combination of an engine and/or an electric machine referred to as electric motor 36. The electric motor 36 may operate as a motor, as a generator or as both. In the current embodiment, the propulsion system 28 includes the electric motor 36 that provides at least some of the torque to drive the wheels 34. Any number of the wheels 34 may be coupled with the propulsion system 28 to propel the vehicle 20. The propulsion system 28 may include a transmission 38 through which the wheels 34 are supplied with torque, and may include a number of gears 40.

In various embodiments the vehicle 20 may differ from that depicted in FIG. 1. For example, in certain embodiments the number of wheels 34, the drive axles, and/or the style of the body 22 may vary. In the embodiment illustrated in FIG. 1, the propulsion system 28 supplies torque to drive the wheels 34 of the front axle 30. In other embodiments, the propulsion system 28 may supply torque to any combination of the axles 30, 32. In embodiments, the electric motor 36 may be integrated into the transmission 38 or may otherwise be coupled with the propulsion system 28. The electrical grounding system 18 may be included in any of multiple locations within the propulsion system 28 or in other systems of the vehicle 20. The electric motor 36 includes a housing 42 that is grounded to the chassis 24, such as by a ground strap 44. As such, the chassis 24 serves as ground for electrical systems of the vehicle 20 and the housing 42 is coupled directly therewith to ground the electric motor 36.

Figure 2:
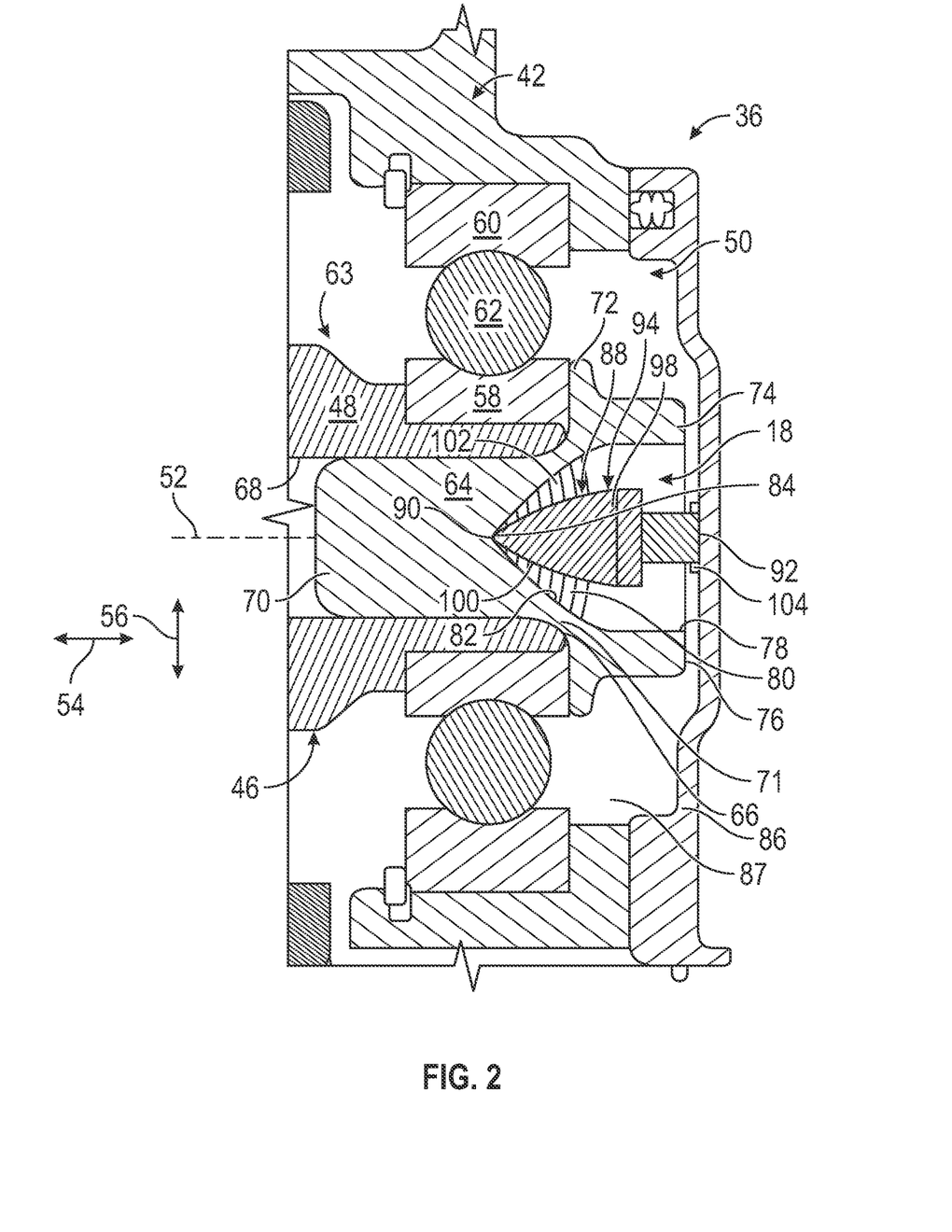
FIG. 2 is a fragmentary, cross sectional illustration of a part of the electric machine of the vehicle of FIG. 1, in accordance with various embodiments.

Referring to FIG. 2, a part of the electric motor 36 in the area of the electrical grounding system 18 is shown in cross section. The housing 42 of the electric motor 36 supports and/or is part of the stator of the electric motor 36. A rotor 46 of the electric motor 36 includes a shaft 48 rotatably supported on the housing 42 by a number of bearings including a bearing assembly 50. The rotor 46 is configured to rotate about an axis 52 that extends longitudinally through the shaft 48. As referred to herein, an axial direction 54 is the direction along or parallel to, the axis 52. A radial direction 56 is the direction extending perpendicular to the axis 52 and, if extended, passing through the axis 52 along a radial line.

In the current embodiment, the bearing assembly 50 includes an inner race 58 fixed to the shaft 48 and an outer race 60 fixed to the housing 42. A number of rolling elements 62 are captured between the inner race 58 and the outer race 60 and provide a low friction rolling action for rotation of the shaft 48 within the housing 42. In the current embodiment, the rolling elements 62 are balls. In other embodiments, the rolling elements 62 may be configured in another physical form such as cylindrical rollers, pins, etc. In a number of embodiments, the bearing assembly 50 may take another form such as a journal bearing where the inner race 58 rides on the outer race 60. In the current embodiment, the shaft 48 is a part of a shaft assembly 63 that includes an insert 64 fixed into the end 66 of the shaft 48. The insert 64 may serve as a retainer for the inner race 58 of the bearing assembly 50.

The surface features of the inner race 58, the outer race 60 and the rolling elements 62 are configured to provide low friction for free rotation of the rotor 46 within the housing 42. As such, degradation of the surfaces may result in added friction, noise, vibration and other undesirable outcomes. As such, electric voltage induced in the shaft 48 may, if allowed to build-up, run from the shaft 48 to the housing 42 through the bearing assembly 50 and or through the gears 40 of FIG. 1. As noted above, that electric current may degrade the surfaces of the bearing assembly 50 or gears 40. Accordingly, the electrical grounding system 18 is included to prevent a build-up of voltage differentials and to avoid such currents, including through the bearing assembly 50.

In the current embodiment, the electric motor 36 includes the insert 64. The shaft 48 includes a hollow interior formed by an axial passage 68 that extends longitudinally along the axis 52 and opens through the end 66. The insert 64 includes a cylindrical body 70 fixed in the axial passage 68 and includes a flange 72 extending in the radial direction 56 outward around the end 66 and along the inner race 58. A cone section 71 of the insert 64 extends between the cylindrical body 70 and the flange 72. In this embodiment, the cone section 71 comprises a cone section because it is conical-like in shape with a conical-like profile. As used herein the terms conical/cone include true cone shapes with straight sides and also includes shapes that are cone-like, such as those that have bowed or curves sides leading from their base to their apex (a.k.a. vertex). The insert 64 includes an annular ring 74 extending in the axial direction 54 from the flange 72 and away from the body 70 to an end 76. An opening 78 is formed into the insert 64 through the end 76. The opening 78 includes a section 80 that is of a hollow conical shape and is formed by a surface 82 of the insert 64 on the cone section 71. The opening 78 includes an apex 84 at the axis 52. As defined above, in embodiments the surface 82 may be linear, convex or concave defining a cone-like structure that defines the section 80 of the opening 78. In other embodiments, the surface 82 may define a profile with another shape.

The electric motor 36 includes a cover 86 on the housing 42 closing a cavity 87 that contains the bearing assembly 50 and the insert 64. The cover 86 extends across the end 76 of the insert 64 and is spaced therefrom to allow the insert to rotate while the cover 86 does not. The cover 86 also extends radially across the end 66 of the shaft 48 and across the axis 52. The cover 86 is generally plate-like in shape and extends generally in the radial direction 56 outward from the axis.

The electrical grounding system 18 includes a ground assembly, in this case configured as a bar assembly 88 that is disposed in the cavity 87 and generally within the opening 78. The ground assembly may be referred to as a bar assembly 88 or as a ground bar assembly. The bar assembly 88 includes a tip 90 that engages the insert 64 of the shaft assembly 63 at or around the apex 84. The tip 90 may be pointed or more rounded such as with a ball shape and is made of a hardened material such as bearing steel. The bar assembly 88 extends in the axial direction 54 from the tip 90 to a tail 92 that engages the cover 86. The cover 86 provides a holding function for the bar assembly 88 to hold the tail 92 in position and may be referred to as a holder and/or a bar assembly holder. The cover 86 includes a collar 104 into which the tail 92 is received and as such, the cover 86 provides a stem mounting function for a stem 96. The collar 104 maintains the tail 92 in a centered position on the axis 52. The tail 92 and/or the collar 104 may have an anti-rotation device such as a flat or other feature to inhibit rotation of the bar assembly 88.

In general, the bar assembly 88 includes a head 94 that has the tip 90 and the stem 96 that has the tail 92. The head 94 includes a profile section 98 formed by a surface 100. As defined above, in embodiments the surface 100 may be linear, convex, concave or a combination thereof. In the current embodiment, the profile section 98 defines a conical or cone-like structure. The surface 100 generally faces the surface 82 of the insert 64. In embodiments, the surface 100 may be shaped to mimic the shape of the surface 82 thereby optimizing electrical contact with the rotor 46. A number of strands 102 are fixed to the head 94 and extend from the surface 100 and engage the surface 82. The strands 102 are made of a conductive material. Therefore, a ground path is provided from the shaft 48 of the shaft assembly 63 to the housing 42. The ground path starts at the shaft 48, and includes the insert 64, the strands 102, the head 94, the stem 96, the cover 86 and the housing 42. As noted above, the housing 42 is grounded to the chassis 24/body 22, such as by the ground strap 44 of FIG. 1. As such, the shaft 48 is continuously coupled to ground preventing a build-up of voltage differentials and avoiding current discharges through elements such as the bearing assembly 50. The contact between the rotating and non-rotating parts of the electrical grounding system 18 is minimized to a point, or near point, contact area at the tip 90/apex 84, minimizing friction. As such, the bar assembly 88 is concentric/coaxial with the shaft 48. In addition, the rotating contact area at the apex 84 is at the axis 52, which is the slowest moving part of the rotating rotor 46. In addition to the point contact at the tip 90, the strands 102 provide a large number of conduction routes.

The strands 102 are made of a material with conductive properties to provide low impedance. The strands 102 are configured as bristle-like structures that may be a single fiber, such as a metal wire fiber, or a number of fibers, such as carbon fibers. The material of the strands 102 is rigid enough to remain in contact with the surface 82 and flexible enough to deflect or bend during assembly and operation. For example, the strands 102 may include carbon fibers. The carbon fibers may be aggregated to produce the strands 102 with larger diameters and/or may be combined in a composite material such as with a polymer. Carbon fibers exhibit beneficial electrical, structural and mechanical properties, including the ability to break the film layer of any lubricant at the surface 82 to improve conductivity. The abrasiveness of the carbon fibers may be tempered by combining the fibers in the composite material and may be tuned to deliver a balance between low impedance/good electrical conduction and adequate rigidity with low wear/friction. In other embodiments, the strands 102 may include a different conductive material such as a metal or a metal in a composite material.

Figure 3:
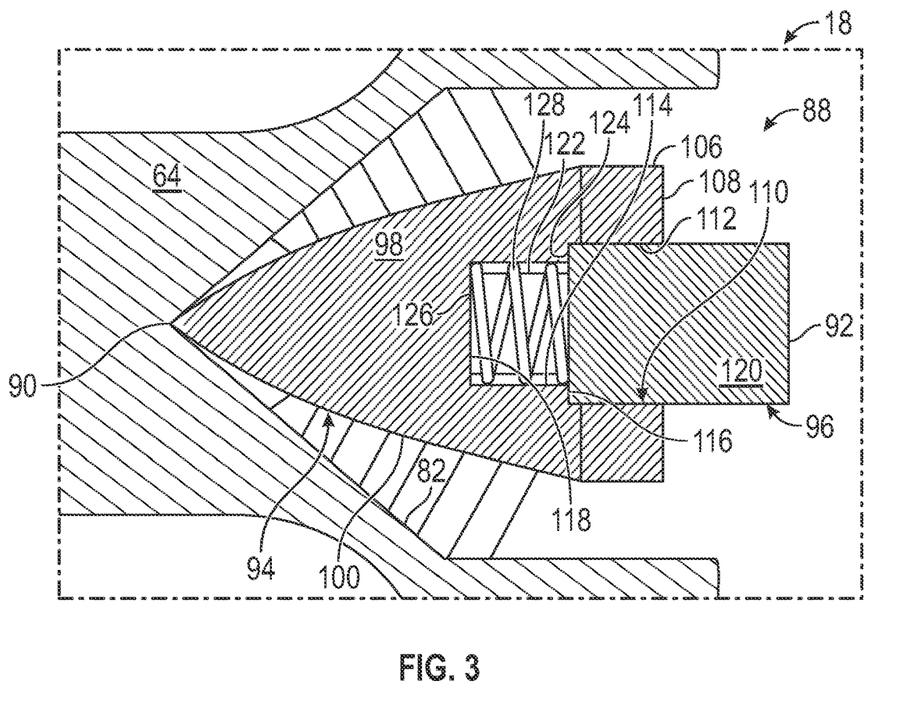
FIG. 3 is a fragmentary, partial cross sectional illustration of a brush assembly of the electric machine of FIG. 2 shown in isolation, in accordance with various embodiments.

Referring to FIG. 3, the bar assembly 88 of the electrical grounding system 18 is shown in isolation and in partial cross section. The head 94 includes the profile section 98 and a cylindrical section 106 at its end 108 opposite the tip 90. A bore 110 extends into the head 94 through the end 108.

The bore 110 extends in the axial direction 54 completely through the cylindrical section 106 and partly through the profile section 98. The bore 110 is stepped including a larger segment 112 and a smaller segment 114. The larger segment 112 starts and the end 108 and extends toward the tip 90 to a step 116. The smaller segment 114 starts at the step 116 and extends toward the tip 90 to a blind end 118. The larger segment 112 has a diameter (radial dimension) larger than that of the smaller segment 114.

The stem 96 includes a larger section 120 and a smaller section 122. The larger section 120 has a diameter (radial dimension) larger than that of the smaller section 124. The larger section 120 starts at the tail 92 and extends to a step 124 of the stem 96. The smaller section 122 extends from the step 124 to a terminal end 126, opposite the tail 92 on the stem 96. The stem 96 has cross sectional shapes that correspond to the cross sectional shapes of the bore 110 for insertion therein. With the smaller section 122 of the stem 96 in the smaller segment 114 of the bore 110, and the larger section 120 in the larger segment 112, a castle-type joint is provided. The stem 96 is configured to slide within the bore in the axial direction 54 with at least one feature, such as a corner, groove, key etc., on the stem 96 or in the bore 110 for anti-rotation purposes to inhibit rotation of the head 94.

A spring 128 is disposed in the smaller segment 114 of the bore 110. In the illustration, the spring 128 and the smaller section 122 are not sectioned for visibility. In the current embodiment, the spring 128 is of the coil type and spirals around the smaller section 122 of the stem 96. The spring 128 is compressed between the blind end 118 of the bore 110 and the larger section 120 of the stem 96 at the step 124. As a result, the spring 128 biases the tip 90 away from the tail 92, forcing the tip 90 against the insert 64 and the strands 102 against the surface 82. The spring 128 also forces the tail 92 against the cover 86 of FIG. 2 for good conductive contact. Engagement of the tip 90 with the insert 64 limits compression of the strands 102 to prevent over-flexing, while maintaining contact of the strands 102 with the surface 82. The strands 102 may be distributed around the circumference of the surface 100 of the profile section 98 and brush against the surface 82 during rotation of the rotor 46. Using the castle-type joint limits compression of the spring 128 due to engagement of the larger section 120 with the step 124 at a limit of travel.

Figure 4:
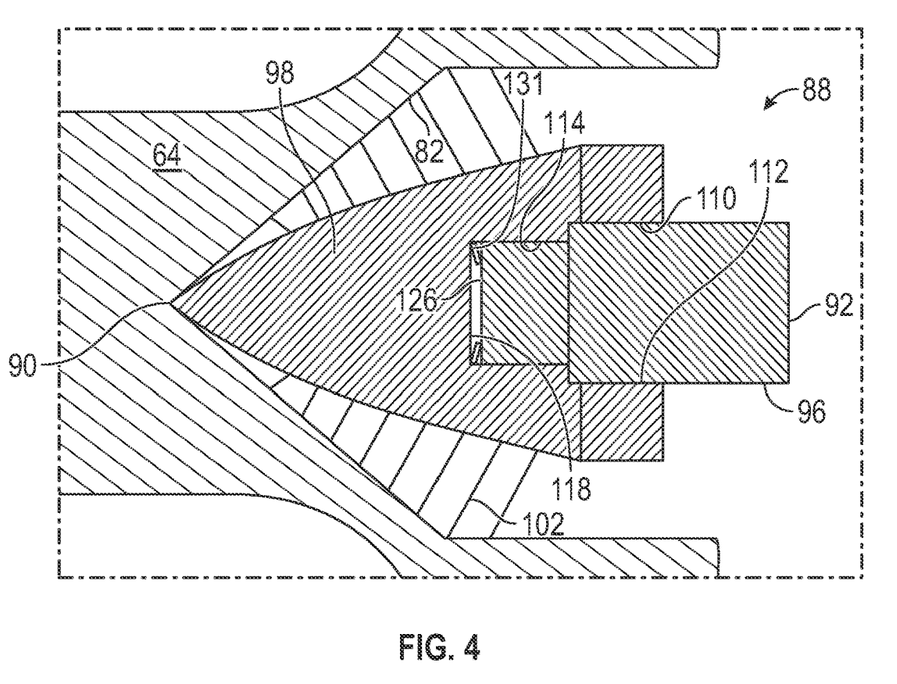
FIG. 4 is a cross sectional illustration of an alternate brush assembly for use in the electric machine of FIG. 2 shown in isolation, in accordance with various embodiments.

In FIG. 4, the spring 128 is replaced with a spring 131 of the spring washer type, which comprises a beveled washer made of a spring steel material. The spring 131 is also disposed in the smaller segment 114 of the bore 110. In this embodiment, the spring 131 is compressed between the blind end 118 of the bore 110 and the terminal end 126 of the stem 96. The spring 131 also biases the tip 90 away from the tail 92 to force the tip 90 against the insert 64 and the strands 102 against the surface 82. The spring 131 may be used where less travel of the head 94 is needed in the axial direction 54, or where less packaging space is available.

Because rotating systems often include lubricant, the presence of oil at the surface 82 creates a film layer that acts to inhibit metal-to-metal contact. The strands 102 act to break the film strength of the lubricant and ensure conductive contact between the insert 64 of the shaft assembly 63 and the head 94. Providing several (e.g., >20) separate strands on the head 94 ensures continuous contact as the strands 102 brush against the surface 100.

Figure 5:
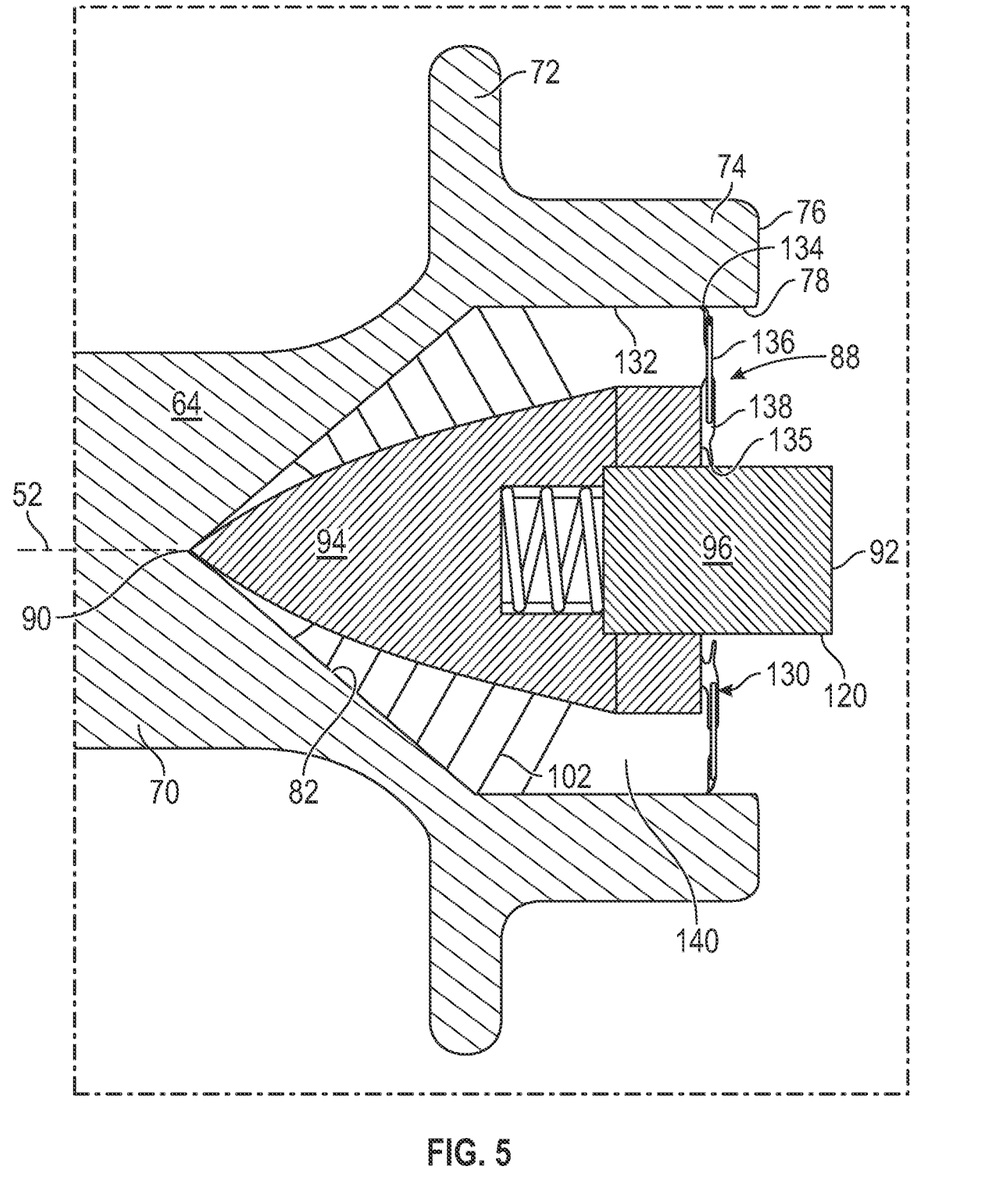
FIG. 5 is a partial cross sectional illustration of the brush assembly of FIG. 3 shown in-situ in a shaft insert with a seal assembly, in accordance with various embodiments.

Referring to FIG. 5, in some embodiments, lubrication may be circulated axially through the shaft 48 and/or the insert 64. In embodiments where lubrication is not needed in the opening 78, a seal assembly 130 may be included to seal the area of the strands 102. The insert 64 includes an annular surface 132 of the annular ring 74 that is annular in shape and faces inward toward the axis 52. The seal assembly 130 includes an outer perimeter 134 engaged against the annular surface 132. The outer perimeter 134 may be sized to create a press-fit in the opening 78 or the seal assembly 130 may otherwise be retained. The seal assembly 130 includes an inner perimeter 135 engaged against the stem 96 at the larger section 120. The outer perimeter 134 may be formed by a support 136 that is rigid and the inner perimeter 135 may be formed by a resilient element 138 mounted on the support 136. The resilient element 138 may be, for example, a lip seal type device that seals against the stem 96. The seal assembly 130 may rotate with the insert 64. As a result of including the seal assembly 130, the head 94 is contained in a sealed cavity 140 defined by the insert 64 and the seal assembly 130. As such, lubricant is excluded from the sealed cavity 140 so as to not interfere with conductive contact between the strands 102 and the surface 82.

Figure 6:
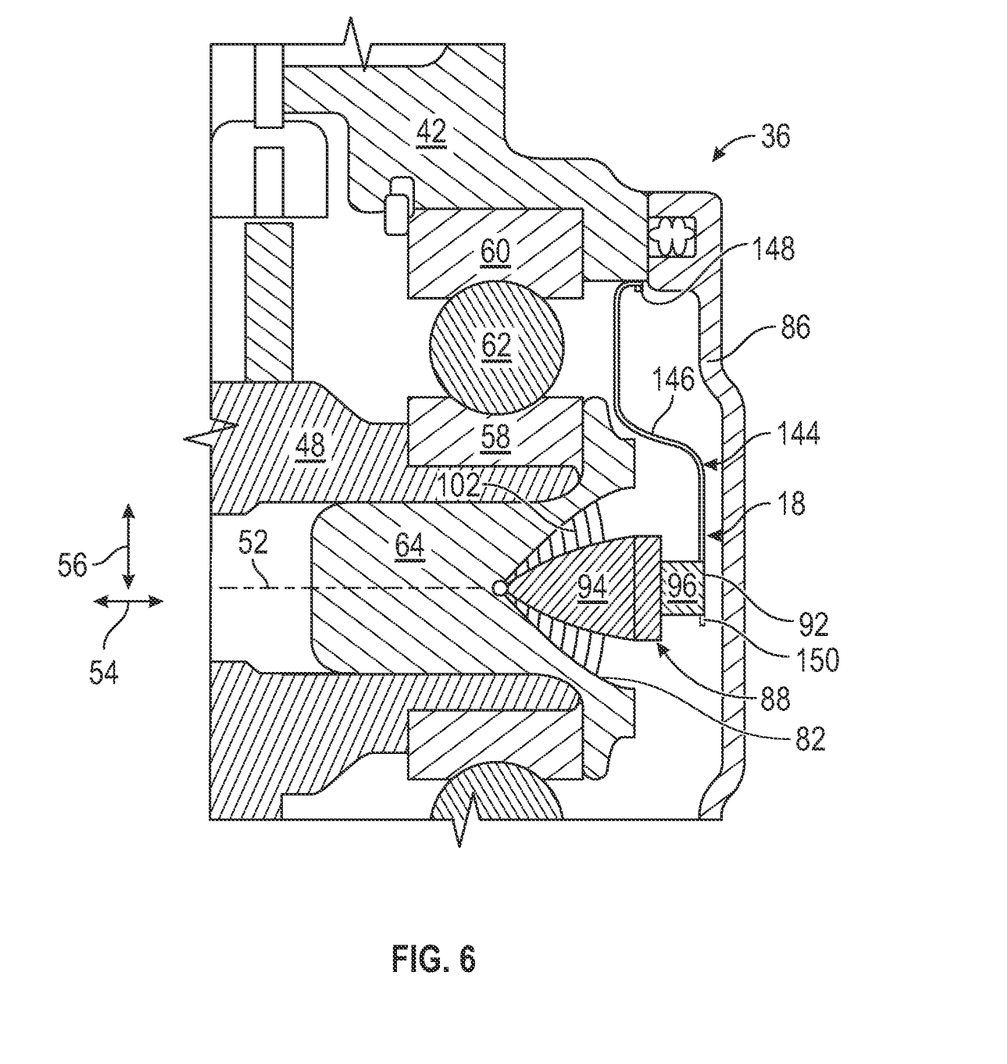
FIG. 6 is a fragmentary, cross sectional illustration of a part of the electric machine of the vehicle of FIG. 1, including a cantilever holder, in accordance with various embodiments.

As shown in FIG. 6, the stem mounting function for the bar assembly 88 is supplied by an arm 144 as the holder/ground bar assembly holder. The arm 144 comprises a cantilevered beam-like structure that includes an offset 146. The arm 144 includes an end 148 fixed to the housing 42 and extends inward in the radial direction 56 across the axis 52 to an end 150. The arm 144 engages the tail 92 of the stem 96 near the end 150. The arm 144 may be fixed to the tail 92 such as by a fastener or a joint, or another retention mechanism may be provided to maintain contact. The arm 144 is conductive to provide electrical coupling between the stem 96 and the housing 42. In addition, the arm 144 may flex providing a spring function biasing the bar assembly 88 toward the insert 64 and obviating a need for a separate spring, such as the springs 128, 131.

Figure 7:
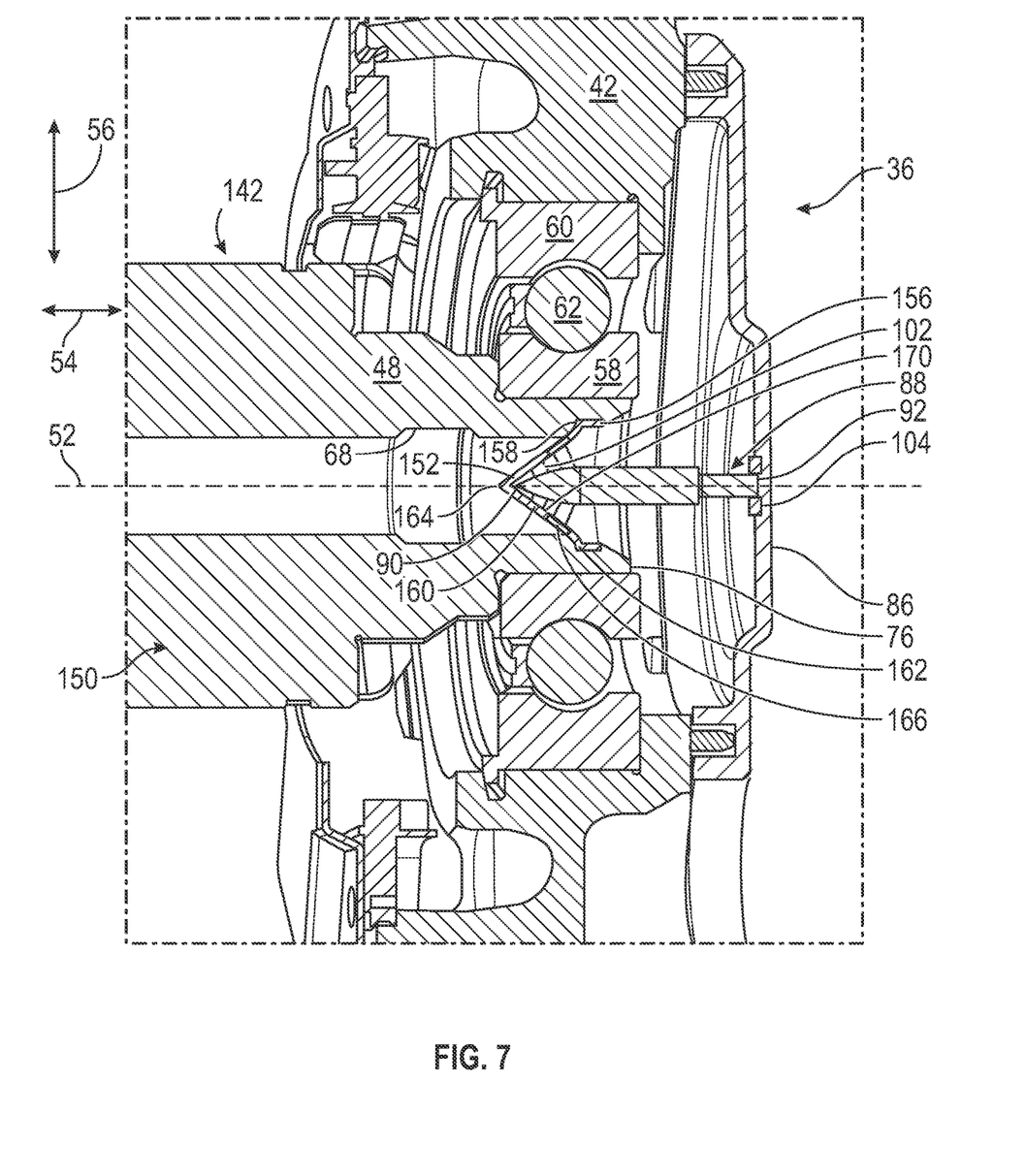
FIG. 7 fragmentary, cross sectional illustration of a part of the electric machine of the vehicle of FIG. 1, for a hollow shaft application, in accordance with various embodiments.

An embodiment including a shaft assembly 142 with axial lubrication circulation is illustrated in FIG. 7, to which reference is directed. In some embodiments, the insert 64 of FIG. 2 may include axial holes for lubrication flow. In the current embodiment, a bearing retention function is not needed, such as supplied by the insert 64 of FIG. 2. As such, an insert 152 is included. The insert 152 is disposed entirely within the axial passage 68 of the shaft 48. The insert 152 includes an annular section 156 that fits against a step 158 of the shaft 48 so that the insert 152 rotates with the shaft 48. The insert 152 includes a cone section 160 that is open and that extends from a base 162 at the annular section 156 and across the axial passage 68. The cone section 160 includes an apex 164 at the axis 52. The apex 164 is disposed further inboard from the end 76 of the shaft 48 than the base 162. A number of holes 166 are provided through the cone section 160 in the axial direction 54. The holes 166 allow lubricant to pass through the insert 152 as it moves through the axial passage 68. The tip 90 of the bar assembly 88 is disposed against the insert 152 at or around the apex 164 and the tail 92 is held by the cover 86 within the collar 104. The strands 102 engage against a surface 170 of the insert 152. Accordingly, the insert 152 provides electrical coupling between the shaft 48 of the shaft assembly 142 and the bar assembly 88. As defined above, in embodiments the surface 170 may be linear, convex and/or concave and in the current embodiment defines a cone-like structure.

Figure 8:
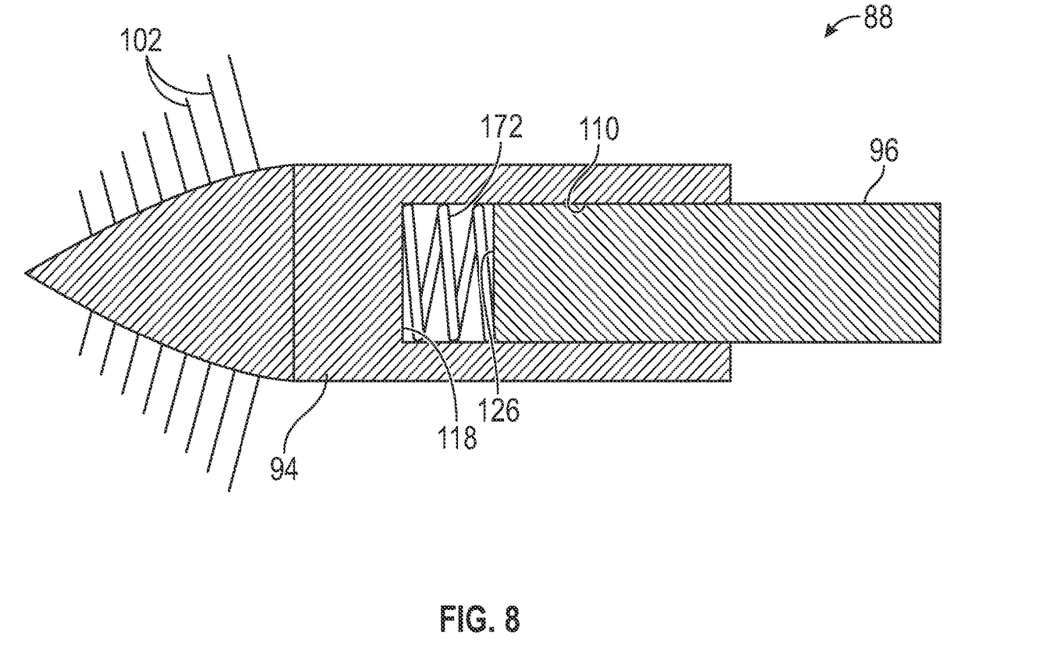
FIG. 8 is a partial cross sectional illustration of a brush assembly of FIG. 7 shown in isolation, in accordance with various embodiments.

In the embodiment of FIG. 7, a spring function may be provided as described above, such as by the spring 128. However, in the current embodiment, the bar assembly 88 includes a non-castellated joint as shown in FIG. 8. The stem 96 has an un-stepped cylindrical shape. The bore 110 of the head 94 has a consistent cylindrical shape. A spring 172 is disposed between the terminal end 126 and the blind end 118. The non-castellated joint may be used where a compression limiting feature of the spring 172 is not needed.

Figure 9:
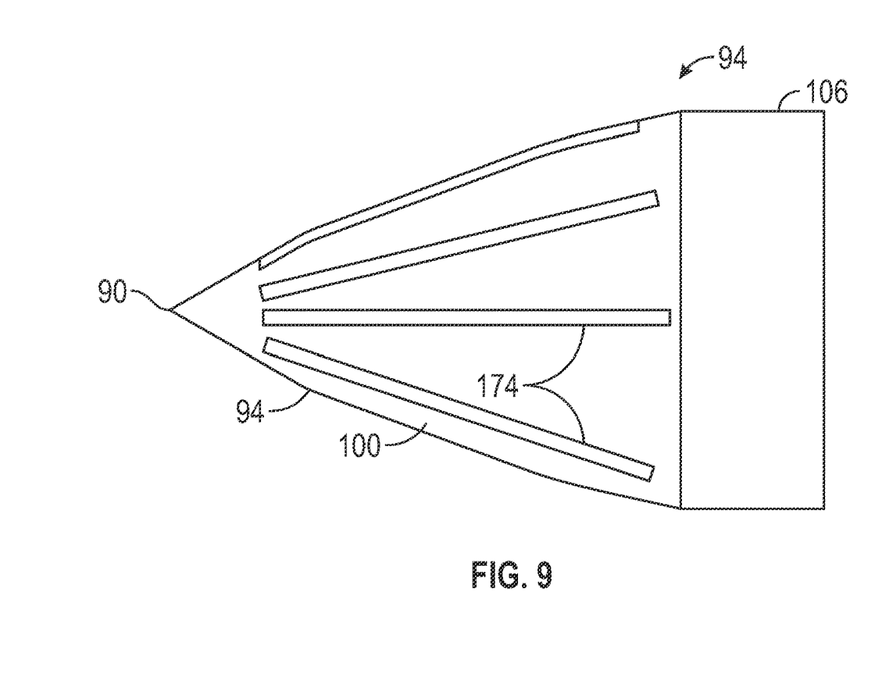
FIG. 9 is a schematic, plan view illustration of the head of the brush assembly of FIG. 3, in accordance with various embodiments.
Figures 10, 11:
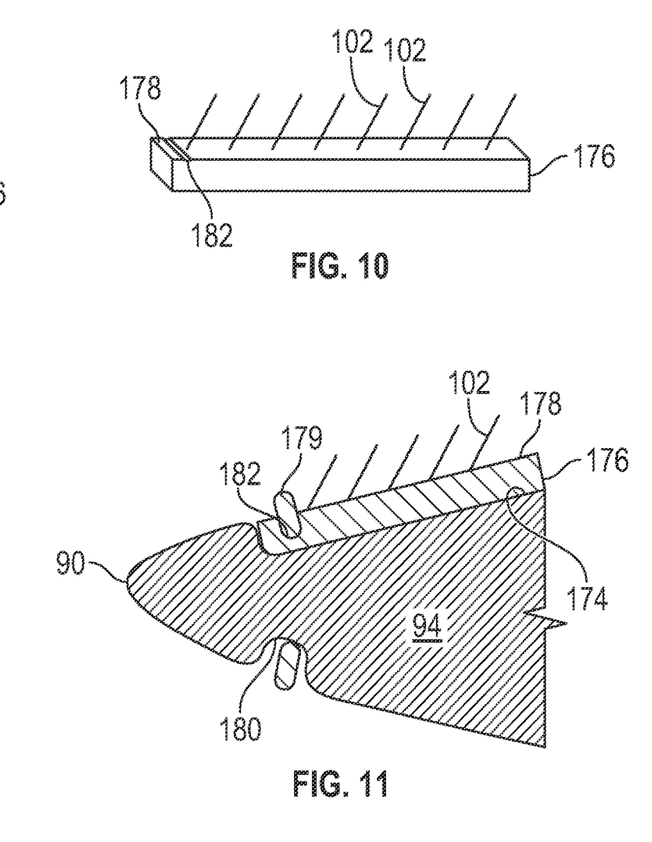
FIG. 10 is a schematic, perspective view of a strand block of the head of FIG. 9, in accordance with various embodiments.
FIG. 11 is a schematic, illustration of a strand block retention system of the head of FIG. 9, in accordance with various embodiments.

Referring to FIG. 9, a plan view of the head 94 without the strands 102 added shows that a number of grooves 174 are provided in the surface 100. The grooves 174 extend along the head 94 generally in a lengthwise direction from the tip 90 toward the cylindrical section 106. The grooves 174 extend into the head 94 a consistent depth from the surface 100. FIG. 10 shows that a number of the strands 102 are fixed in a brush assembly configured as a brush block 176. The brush block 176 is formed as a conductive rectangular bar that includes a surface 178 out of which the strands 102 extend. The brush block 176 may be formed around the strands 102 or may be formed with openings into which the strands 102 are fixed. The brush block 176 is sized to fit within one of the grooves 174 and includes a slot 182.

As shown in FIG. 11, one brush block 176, with strands 102, is positioned in one of the grooves 174 and retained therein. During assembly each groove 174 will receive one brush block 176. In the current embodiment, the brush blocks 176 are retained in the grooves 174 by a snap ring 179. The head 94 includes an annular groove 180 spaced from the tip 90. Each of the brush blocks 176 includes a slot 182 in its surface 178 that aligns with the annular groove 180. Once a brush block 176 is positioned in each of the grooves 174, the snap ring 179 is added to the annular groove 180 and to seat in the slots 182 to retain the brush blocks 176 on the head 94 with electrical conductivity. The number of brush blocks 176 each with a plural number of strands 102 provides coverage of a majority of the head 94 with the strands 102.

Figure 12:
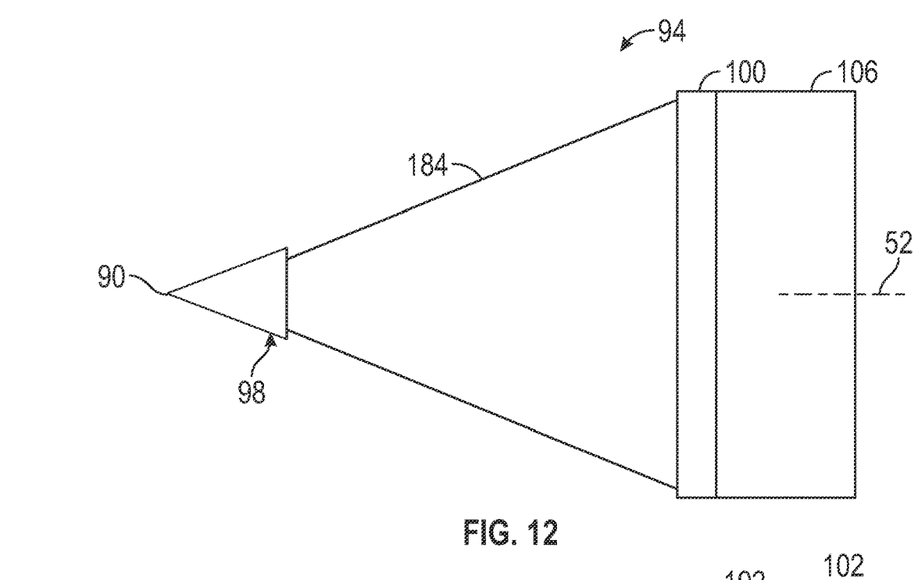
FIG. 12 is a schematic, fragmentary, plan view illustration of an alternate head for the brush assembly of FIG. 3, in accordance with various embodiments.
Figure 13:
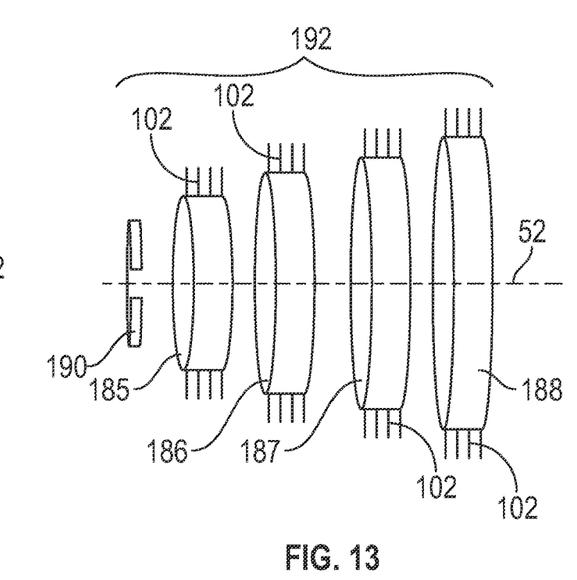
FIG. 13 is a schematic, expanded view of the brush ring set of the head of FIG. 12, in accordance with various embodiments.

Referring to FIG. 12, an alternate embodiment of retaining the strands 102 to the head 94 is illustrated. In this embodiment, the head 94 includes an annular groove 184 extending into the surface 100 and around the axis 52. The annular groove 184 is spaced from the tip 90 and from the cylindrical section 106 and extends along most of the profile section 98. As shown in FIG. 13, a set of four brush rings 185-188 is illustrated with a snap ring 190 collected in a ring set 192. Each of the brush rings 185-188 comprises a brush assembly. The ring set 192 is arranged in the order they will be assembled onto the head 94. Each brush ring 185-188 is formed as a ring shaped assembly to fit at its own location in the annular groove 184 and each includes a number of strands 102. The brush rings 185-188 have increasing diameters from brush ring 185 to brush ring 188. The snap ring 190 is split and has a diameter small than the smallest of the brush rings (i.e., brush ring 185).

Figure 14:
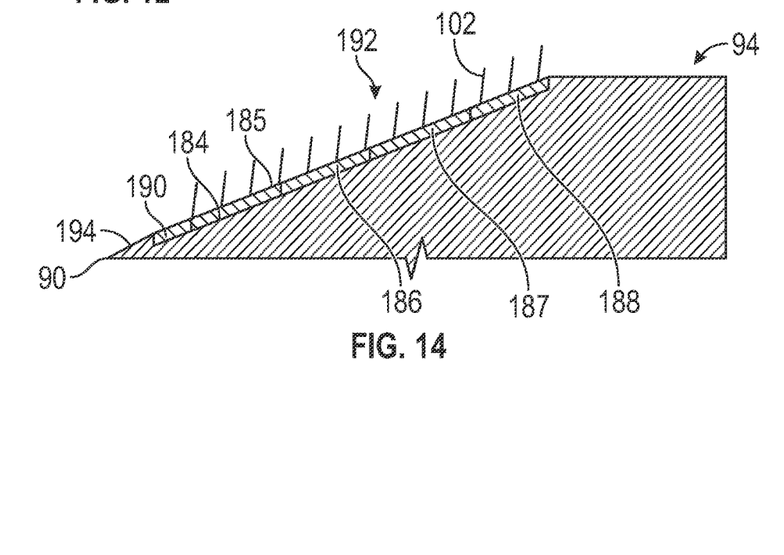
FIG. 14 is a fragmentary, cross sectional illustration of part of the head of FIG. 12 with brush rings added, in accordance with various embodiments.

Referring to FIG. 14 the ring set 192 is shown assembled onto the head 94 in the annular groove 184. The brush ring 188 is added first, followed by, in order, the brush ring 187, the brush ring 186 and the brush ring 185. The brush rings 185-188 are not split as they are sized to pass over the step 194 at the end of the annular groove 184 nearest the tip 90. The snap ring 190 may be expanded, passed over the tip 90 and into the annular groove between the step 194 and the brush ring 185 and allowed to contract. Thus, the snap ring 190 retains the brush rings 185-188 in position in the annular groove 184 providing coverage of a majority of the head 94 with the strands 102.

Through the foregoing embodiments, rotor shaft electrical grounding is continuously provided, avoid discharge type deterioration of components such as bearings and gears. Slip motion on the rotor is provided at or near the center of the shaft for low friction losses. Strands are provided with brush action on a profiled/conical surface and in a large number providing low impedance and multiple continuous paths to ground, effectively avoiding sporadic voltage discharges. A compact package is provided for addition to motor designs without major modifications and the strands are readily assembled into the system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An electrical grounding system for an electric machine, the electrical grounding system comprising:
   a rotor including a shaft assembly configured to rotate about an axis, the shaft assembly having a surface disposed on a first cone section of the shaft assembly;
   a housing supporting the shaft assembly for rotation of the rotor;
   a holder extending from the housing; and
   a ground assembly concentric with the shaft assembly and held between the holder and the shaft assembly, the ground assembly comprising a bar assembly that includes a head with a second cone section that faces the first cone section, wherein the second cone section is spaced from the first cone section, the ground assembly including a plurality of strands that extend to the surface to ground the shaft assembly to the housing, wherein the strands are fixed in the head and extend from the second cone section to the first cone section in a direction non-perpendicular to the axis.

2. The electrical grounding system of claim 1, wherein the ground assembly includes a tip contacting the shaft assembly and includes a tail held by the holder.

3. The electrical grounding system of claim 1, comprising a bearing disposed in the housing and supporting the shaft assembly, wherein the holder comprises a cover engaged with the housing and covering the bearing.

4. The electrical grounding system of claim 1, wherein the holder comprises a cantilevered arm fixed to the housing.

5. The electrical grounding system of claim 1, comprising a bearing in the housing supporting the shaft assembly, wherein the shaft assembly includes an insert that has a flange extending radially outward and engaging the bearing to retain the bearing in the housing, wherein the surface is defined by the insert.

6. The electrical grounding system of claim 1, wherein the strands comprise carbon fibers aggregated to form the strands as bristle-like structures.

7. The electrical grounding system of claim 1, comprising a number of brush assemblies, each brush assembly carrying a plurality of the strands and each brush assembly fixed to the ground assembly.

8. The electrical grounding system of claim 1, wherein the ground assembly comprises a stem engaged in an opening of the head by a castle joint that includes a step.

9. The electrical grounding system of claim 8, comprising a spring contained in the opening and captured between the head and the stem.

10. An electrical grounding system for an electric machine, the electrical grounding system comprising:
- a rotor including a shaft assembly configured to rotate about an axis, the shaft assembly including a shaft and an insert contained in the shaft;
- a housing supporting the shaft assembly for rotation of the rotor;
- a holder extending from the housing and across the axis; and
- a bar assembly held between the holder and the insert, the bar assembly including a profile section containing a plurality of strands that extend to the insert.

11. The electrical grounding system of claim 10, wherein:
- the bar assembly includes a head that defines a profile section, and the insert includes a surface facing the profile section,
- the surface is spaced from the profile section, and
- the strands are fixed in the head and extend from the profile section to the surface.

12. The electrical grounding system of claim 10, wherein the bar assembly includes a head with a tip contacting the shaft assembly and includes a stem engaging the head, the stem including a tail held by the holder.

13. The electrical grounding system of claim 12, wherein the housing defines a cavity and comprising a bearing in the cavity and supporting the shaft assembly, wherein the holder comprises a cover engaged with the housing, closing the cavity, and covering the bearing.

14. The electrical grounding system of claim 10, wherein the holder comprises an arm fixed to the housing, the arm extending across the axis and including an offset section, the arm biasing the bar assembly toward the insert.

15. The electrical grounding system of claim 10, comprising a bearing in the housing supporting the shaft assembly, wherein the insert includes a flange extending radially outward and engaging the bearing to retain the bearing in the housing.

16. The electrical grounding system of claim 10, wherein the strands comprise carbon fibers aggregated in a composite structure to form the strands.

17. The electrical grounding system of claim 10, comprising a number of brush assemblies each brush assembly configured as a ring and carrying a plurality of the strands and each brush assembly fixed to the bar assembly.

18. The electrical grounding system of claim 10, wherein the bar assembly comprises a head carrying the strands and a stem engaging in a blind opening of the head by a castle joint with a step, and comprising a spring contained in the blind opening and captured between the head and the stem.

19. An electrical grounding system for an electric machine of a vehicle, the system comprising:
- a propulsion system in the vehicle, the electric machine configured to supply torque to the propulsion system;
- a rotor of the electric machine including a shaft assembly configured to rotate about an axis, the shaft assembly including a shaft and an insert contained in the shaft, the insert having a cone section;
- a housing supporting the shaft assembly for rotation of the rotor;
- a holder extending from the housing and across the axis; and
- a bar assembly held between the holder and the insert,
- wherein the bar assembly includes a head with a tip contacting the shaft assembly in the cone section, and the bar assembly includes a stem engaging the head, the stem including a tail held by the holder,
- wherein the strands are contained by the head and electrical conductivity is provided between the shaft and the housing through the bar assembly and the holder.

* * * * *